United States Patent [19]
Kawasaki

[11] Patent Number: 5,571,969
[45] Date of Patent: Nov. 5, 1996

[54] VIBRATION DETECTION AND REDUCTION SYSTEM AND VIBRATION SENSORS FOR USE IN MICRO-GRAVITY ENVIRONMENT

[75] Inventor: Shuichi Kawasaki, Nagoya, Japan

[73] Assignee: Mitsubishi Jukogyo Kabushiki Kaisha, Tokyo, Japan

[21] Appl. No.: 59,753

[22] Filed: May 12, 1993

[30] Foreign Application Priority Data

May 14, 1992 [JP] Japan ..................... 4-121989
Sep. 14, 1992 [JP] Japan ..................... 4-244625

[51] Int. Cl.⁶ .................................................. G01H 11/00
[52] U.S. Cl. ........................................ 73/649; 73/514.26
[58] Field of Search ........................... 73/505, 649, 602, 73/652, 653, 662

[56] References Cited

U.S. PATENT DOCUMENTS

| | | |
|---|---|---|
| 3,232,120 | 2/1966 | Ensley . |
| 4,170,904 | 10/1979 | Fischell et al. . |
| 5,096,017 | 3/1992 | Rey et al. ................................. 73/505 |
| 5,245,695 | 9/1993 | Basehore ................................. 395/3 |
| 5,285,377 | 2/1994 | Sugasaka et al. ........................ 364/148 |
| 5,367,612 | 11/1994 | Bozich et al. ........................... 395/22 |

OTHER PUBLICATIONS

Acta Astronautica, vol. 29, No. 2, Feb. 1993, Great Britain, pp. 83–97, Eilers, D. et al., "Microgravity Environment Dynamic Disturbances" *whole document*.
IEEE International Conference On Systems Engineering, 17 Sep. 1992, Kobe, Japan, pp. 576–579, Zhenya He et al., "Neural Network And Its Application On Machinery Fault Diagnosis", *p. 576, left column, line 1–p. 577, left column, line 22*; p. 578, right column, line 40–p. 579, right column, line 9; FIGS*.
Proceedings of the 29th IEEE Conference On Decision And Control, vol. 5, 7 Dec. 1990, Honolulu, Hawaii, pp. 2569–2574, Hyland, D.C. et al., "A Nonlinear Vibration Control Design With A Neural Network Realization", *whole document*.

Proceedings of the 1990 American Control Conference, vol. 3, 23 May 1990, San Diego, California, USA, pp. 2601–2606, Jones, D. I., "Strategies For Controlling A Microgravity Isolation Mount", *whole document*.

Archive of Applied Mechanics, vol. 63, No. 2, Mar. 1993, Germany, pp. 130–149, Reithmeier, E. et al., "Semiaktive Regelung Zur Amplitudenunterdrückung Von Schwingungssystemen Unter Einsatz Elektrorheologischer Flüssigkeiten", *abstract*, *p. 130, line 1–p. 131, line 17*, *p. 147, line 14–line 28*.

*Primary Examiner*—Richard Chilcot
*Assistant Examiner*—Max Noori
*Attorney, Agent, or Firm*—Wenderoth, Lind & Ponack

[57] ABSTRACT

The invention is to detect vibrations which would destroy a micro-gravity environment, to grasp factors of the vibrations, to detect and grasp a position and a scale of meteoroid/debris collisions, and to establish a counter-measure. Vibration sensors are disposed in a matrix array on a vibrating body placed in a micro-gravity environment. A computer analyzes a spectrum of the vibration, in a neural network section a vibration source is specified on the basis of the analyzed spectra, in a fuzzy control section, actuators are driven so as to reduce harmful vibrations in response to the vibration energy and the energy source specified by the neural network section, and if necessary, a vibration factor is eliminated. The computer takes in the result of driving for the actuators, the results are learnt in the neural network section and in the fuzzy control section to be ready for generation of vibrations at the next time. The vibration sensor comprises a reflector or a transparent refractor disposed as floating in a micro-gravity space, output means fixed to the vibrating body for emitting energy towards the reflector or transparent refractor, and a receiver fixed to the vibrating body for receiving energy sent from the reflector or transparent refractor and measuring the nature of vibrations of the vibrating body on the basis of movement of the reflected or permeated energy.

8 Claims, 9 Drawing Sheets

VIBRATION DETECTION AND REDUCTION SYSTEM AND VIBRATION SENSORS FOR USE IN MICRO-GRAVITY ENVIRONMENT

BACKGROUND OF THE INVENTION

1. Field of the Invention

The present invention relates to the art of grasping factors for destroying a micro-gravity environment of instruments used in a micro-gravity environment such as a space station, an artificial satelite, a space vehicle, a micro-gravity environment system or the like to establish a counter-measure, and also relates to detection of positions and scales of collision of a meteoroid-debris colliding against these space stations.

Also, the present invention relates to vibration measuring sensors for measuring vibrations of an instrument used in a micro-gravity environment.

2. Description of the Prior Art

Recently, various experiments and communication services have been offered by means of space missions of space stations, space shuttles and the like. As one of the most important problems of this space mission, maintenance of a micro-gravity ($\mu$-G: for instance $1 \times 10^{-5}$ G or less) environment is pointed out.

However, in some cases, this micro-gravity environment is destroyed by vibrations or the like generated due to various causes. Also, sensors for accurately detecting arbitrary vibrations such as vibration energy, a frequency, an amplitude or the like as is the case with the meteoroid/debris collisions, are not present.

In order to maintain this micro-gravity environment, it is desirable to grasp the factors of vibrations destroying the micro-gravity environment and to take a counter-measure for reducing the vibrations. However, in the prior art such counter-measures were not taken. Also, in an assembly of complicated systems such as a space station or the like, it is difficult to grasp a source of generation of vibrations including the collision vibrations of meteoroid/debris.

Furthermore, it is the real status of the art that a procedure for grasping various vibrations under a $\mu$-G (micro-gravity) environment has not yet been established. For instance, a vibration (acceleration) sensor in the prior art measures a vibration (acceleration) by measuring a movement of a vibrator supported by a spring and a material having an inherent damping characteristic such as a damper. However, such sensor involves a problem that it is limited in a frequency or the like of detectable vibrations and it cannot accurately detect vibrations under a micro-gravity environment.

Such type of problems are also the same even in a micro-gravity environment system equipped on the ground or in an airplane.

SUMMARY OF THE INVENTION

The present invention has been worked out under the above-mentioned circumstance, and it is one object of the present invention to provide a system which makes it possible to grasp factors for destroying a micro-gravity environment and to establish a counter-measure against them.

Another object of the present invention is to provide detector means which can accurately detect vibrations under a micro-gravity environment.

In order to achieve the above-mentioned object, the vibration factor analyzing system for use in a micro-gravity environment according to the present invention comprises:

vibration sensors disposed in (a linear array, a matrix-like array or the like) on a vibrating body (a space station or the like) held in a micro-gravity environment;

analyzing means for collecting vibration data detected by the aforementioned vibration sensors and analyzing vibration spectra;

a neural network section for specifying a vibration source on the basis of the vibration spectra analyzed by the above-mentioned analyzing means;

actuators disposed on the above-mentioned vibrating body; and a fuzzy control section responsive to vibration energy and a vibration source specified by the aforementioned neural network section for controllably driving the above-mentioned actuators so as to reduce harmful vibrations and/or eliminating the factors of vibrations.

With the vibration factor analyzing system for use in a micro-gravity environment having the above-described construction, the system itself can achieve optimum driving of the actuators for reducing vibrations or analytic elimination (stoppage) and reduction (lowering of a rotational speed or the like) of the vibration factors (meteoroid/debris collision vibration sources; motors, pumps, etc.) by collecting vibration data and judging. In addition, its performance including an analyzing capability can be improved by itself by again taking in the result of control and learning in the neural network section and the fuzzy control section to be ready for next occurrence of vibrations.

Also, in order to achieve the above-mentioned second object, the vibration sensor for use in a micro-gravity environment according to the present invention comprises:

a reflector disposed as floating in a micro-gravity space (surrounded by vacuum or arbitrary gas) and consisting of a polyhedron having an arbitrary number of surfaces (1-$\infty$surfaces (=sphere)) reflecting predetermined energy such as laser beams, light, electromagnetic waves, sound waves and the like having various frequencies according to known characteristics;

output means fixed to a vibrating body (a space station structure or the like) for irradiating the above-mentioned reflector with the aforementioned predetermined energy; and receiving means fixed to the above-mentioned vibrating body for receiving reflection energy reflected from the above-mentioned reflector and measuring the natures (acceleration, amplitude, frequency, etc.) of vibrations of the above-mentioned vibrating body on the basis of variations of the aforementioned reflection energy.

The above-described vibration sensor for use in a micro-gravity environment according to the present invention does not employ members for supporting a vibrator such as a spring, a damper and the like as used in the conventional vibration sensor, but keeps a reflector consisting of a polyhedron having an arbitrary number of surfaces in an unvibrating condition floating in a zero-gravity environment. And while the output means for irradiating the reflector with energy and the receiving means vibrate jointly with the vibrator, the reflector does not vibrate. Accordingly, minute acceleration/amplitude/gravity and the like can be detected by measuring variations of received energy by the receiving means. Since the reflector is not supported, a range of measurement for the nature (acceleration, amplitude, frequency, etc.) of the detected vibration is not subjected to limitation.

Also, another micro-gravitational vibration sensor according to the present invention comprises a transparent refractor disposed as floating in a micro-gravity space and having known characteristics, an irradiator disposed on one side of the same transparent refractor and fixed to a structure whose vibrations are to be detected for irradiating with light rays, and a light receiver disposed on the other side of the above-mentioned transparent refractor as opposed to the same irradiator and fixed to the above-mentioned structure for receiving the light rays radiated by the irradiator via the transparent refractor. Here, the term "refractor" includes a lens and a prism.

In this micro-gravity vibration sensor, while the irradiator and the light receiver would vibrate jointly with the structure when the structure vibrates because they are fixed to the structure, the transparent refractor would not vibrate because it is floating in a micro-gravity space.

The light rays radiated from the above-mentioned irradiator make incidence to the transparent refractor, then permeate through the transparent refractor after having been subjected to refraction and convergence corresponding to a curved surface configuration, a polyhedron configuration or a configuration consisting of a combination of planes and curved surfaces of the transparent refractor, and are received by the light receiver. However, in the event that the above-described structure is vibrating, since the transparent refractor is held stationary, a light receiving position on a light receiving surface of the above-described light receiver is displaced from the light receiving position in the case where the above-mentioned structure is held stationary by the amount corresponding to the vibration of the structure and the characteristics of the refractor.

The displacement of the light receiving position on the light receiving surface of the above-mentioned light receiver is input to a computer, and the computer having this displacement input calculates an acceleration, an amplitude, a frequency and the like of the structure by making use of the characteristics of the refractor which are determined by the known configuration of the transparent refractor, and outputs them.

With the above-described construction and operation, a vibration sensor which can detect even a minute vibration of a structure under a micro-gravity environment, can be realized.

In addition according to the present invention, the above-described vibration sensor is provided with active vibration-suppressing means for making a reflector or a transparent refractor held stationary in a zero-gravity space, and thereby movements of the reflector or the transparent refractor are suppressed within a predetermined range.

The above-mentioned and other objects, features and advantages of the present invention will become more apparent by reference to the following description of a number of preferred embodiments of the present invention taken in conjunction with the accompanying drawings.

BRIEF DESCRIPTION OF THE DRAWINGS

In the accompanying drawings:

FIG. 7 is a schematic view of a vibration sensor according to a second preferred embodiment of the present invention, FIG. 7(a) being a schematic view showing the state where a lens is fixed, and FIGS. 7(b) and 7(c), respectively, are schematic views showing a mode of operation;

DESCRIPTION OF THE PREFERRED EMBODIMENTS

In the following, a number of preferred embodiments of the present invention will be described in greater detail with reference to the drawings.

Figure 1A:
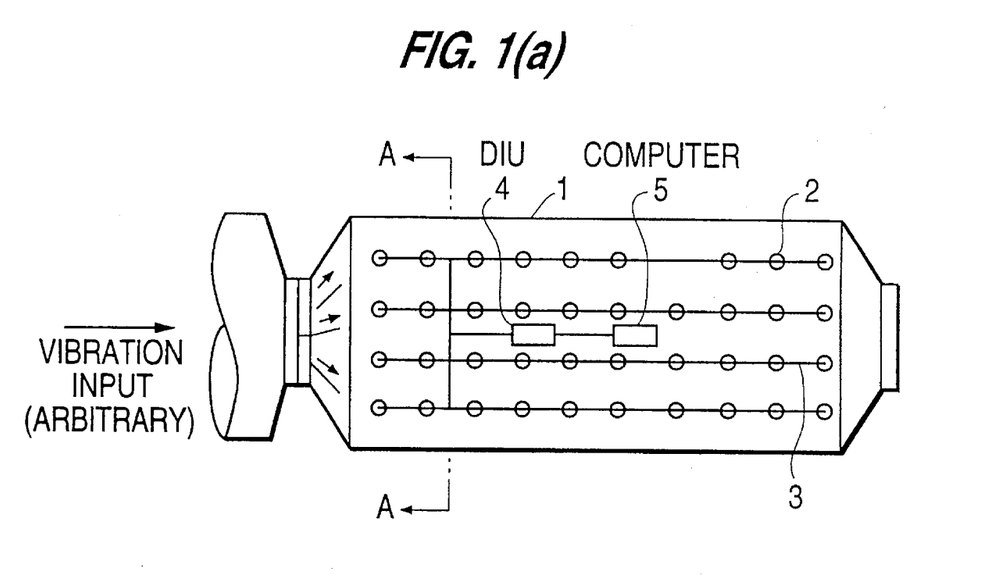
FIG. 1(a) is a front view showing a space station according to one preferred embodiment of the present invention.
Figure 1B:
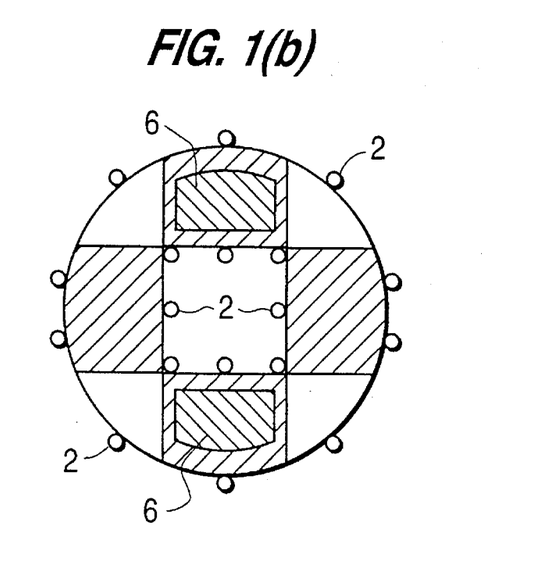
FIG. 1(b) is a cross-section view taken along line A—A in FIG. 1(a) as viewed in the direction of arrows.

As shown in FIG. 1, onto an outer peripheral surface of an airframe of a space station 1 and on the inboard thereof are stuck a large number of vibration sensors (three-dimensional acceleration sensors) 2 in a matrix array at predetermined intervals.

The respective vibration sensors 2 serve to detect vibrations of the airframe of the space station 1, the detected vibration data are collected in a DIU (Data Interface Unit) sampling unit 4 via transmission paths 3 consisting of coaxial cables, twist cables, optical fibers, or the like, and they are fed to a computer 5 via this DIU sampling unit 4.

The computer 5 detects a scale and factors of destruction of a micro-gravity (μ-G) on the basis of the data transmitted from the respective vibration sensor. Furthermore, in order to offset the detected vibrations, the computer 5 selects actuators 6 provided on the airframe, and drives the selected one. If necessary, the computer 5 performs elimination of the factors (vibration generation sources) or reduction of the factors. The computer 5 grasps the result of driving of the actuator 6 and the result of elimination or reduction of the factors by continuous vibration detection data sent from the vibration sensors 2.

Figure 2:
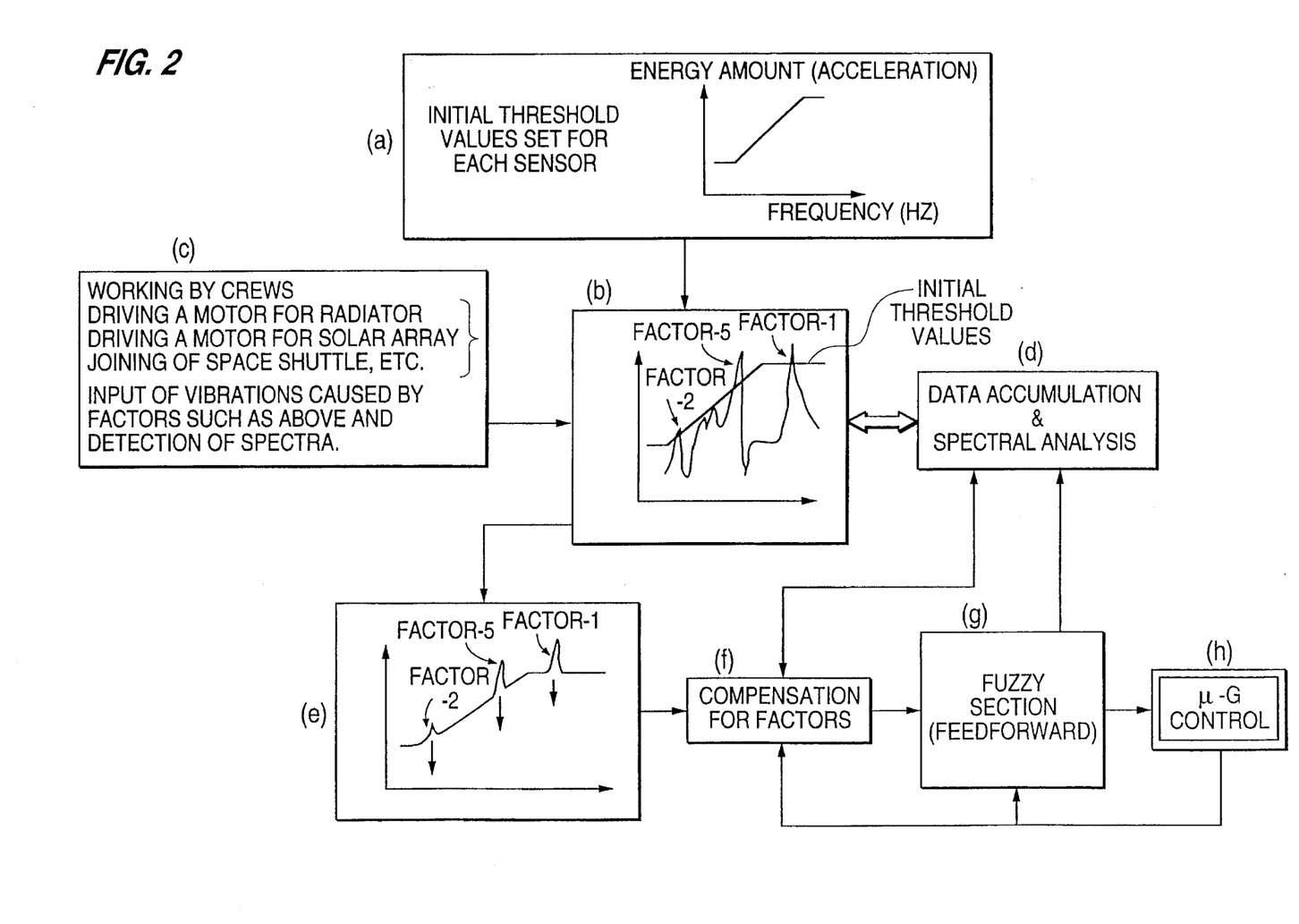
FIG. 2 is a flow diagram showing flows of functions of data processing according to a first preferred embodiment of the present invention.

The flow of a series of system analysis by means of the computer 5 is shown in FIG. 2.

In a block (a) in FIG. 2, initial threshold values of vibration are set for the respective vibration sensors 2 on the basis of various standards, for instance, on the basis of the regulation of NASA (National Aeronautics and Space Administration).

Next, as shown in a block (c), vibrations generated by important causes of generation of harmful vibrations such as operations by crews, driving of various motors, joining of a space shuttle, collision of meteoroid/debris and the like are detected by the vibration sensors 2, and spectral distributions thereof are calculated. Then, the produced spectral distribution and the initial threshold values are superposed as shown in block (b), and composite data are obtained.

The composite data produced in the block (b) are stored in a memory represented by a block (d). In a block (e), a principal factor of the vibrations is extracted as by comparing the vibration spectra with the initial threshold values. Practically, among the composite data, spectra at the protruding portions are detected, and the principal factors of the vibrations having the respective spectra are specifically determined. This block (e) is constructed of neural networks formed in a software fashion.

In order to reduce the vibrations caused by the principal factor which were determined in the block (e), selection of actuators 6 that is effective for offsetting the harmful vibrations is effected and an amount of control for the selected actuator is calculated in a block (f). In addition, in the event that the harmful vibrations cannot be reduced to a predetermined level or lower only by driving the actuator 6, commands for adjusting the movements of crews and the operations of instruments serving as the factors, are issued.

On the basis of the calculation in the block (f), a block (g) outputs commands for selection of the actuators, adjustment of a control amount and operation control of the instruments serving as the factor of the harmful vibrations, and a command for adjusting the movements of crews and the operations of instruments serving as the factors. This block (g) is constructed of fuzzy logics.

On the basis of the commands sent from the block (g), in a block (h), a control signal is actually sent to the actuator 6 to control the actuator 6. Also, the block (g) selects and controls the actuator 6 so as to reduce vibrations expected to arise according to a programmed schedule through feed-forward control based on mission schedule data. In addition, a necessary alarm is output.

The results of these series of control are analyzed by making them once more pass through a software corresponding to the block (f) and a block (g), and they are stored as data in the block (d). In other words, after the actuator 6 was driven, vibrations of an airframe are again detected by the vibration sensors 2, thus the factors are detected, and selection of an actuator 6 which is effective for offsetting harmful vibrations as well as calculation of a control amount are effected. Furthermore, commands for selection of an actuator, adjustment of a control amount and operation control of the instruments serving as the factors of harmful vibrations, are issued, and they are reserved as data in the block (d).

By comparing the data stored in the block (d) with the initial threshold values and the factors, compensative operations (control amount and the like) to be set in the block (f) are reset so that further effective control may be effected for the harmful vibrations to be generated by the respective factors next time. In other words, learning is caused. With regard to meteoroid/debris vibrations, they are classified as special vibrations and stored as data, and also commands are sent to crews of a space station or a space shuttle or to the ground station.

Figure 3:
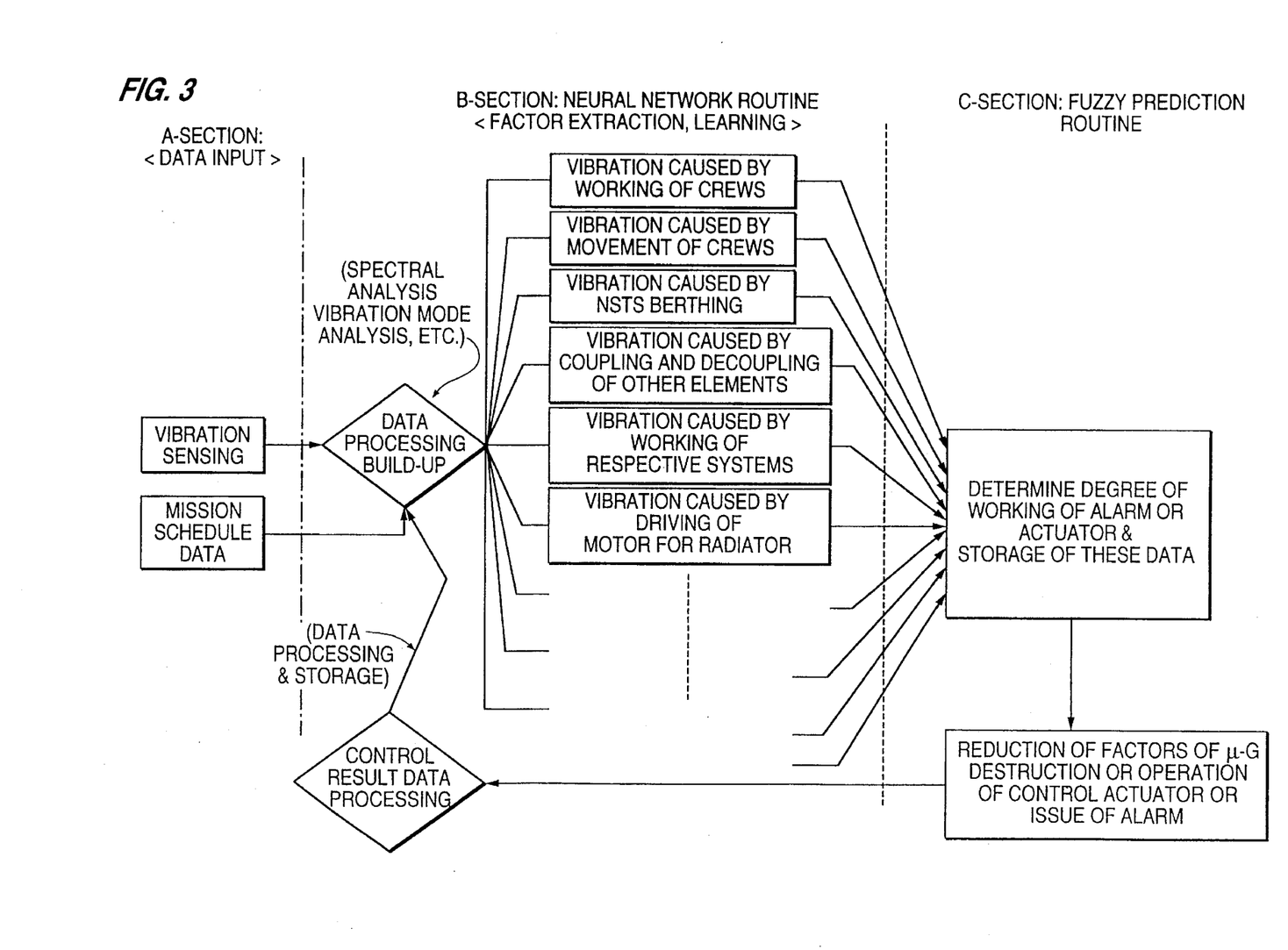
FIG. 3 is a flow diagram of a system software for realizing the data processing shown in FIG. 2.
Figure 4:
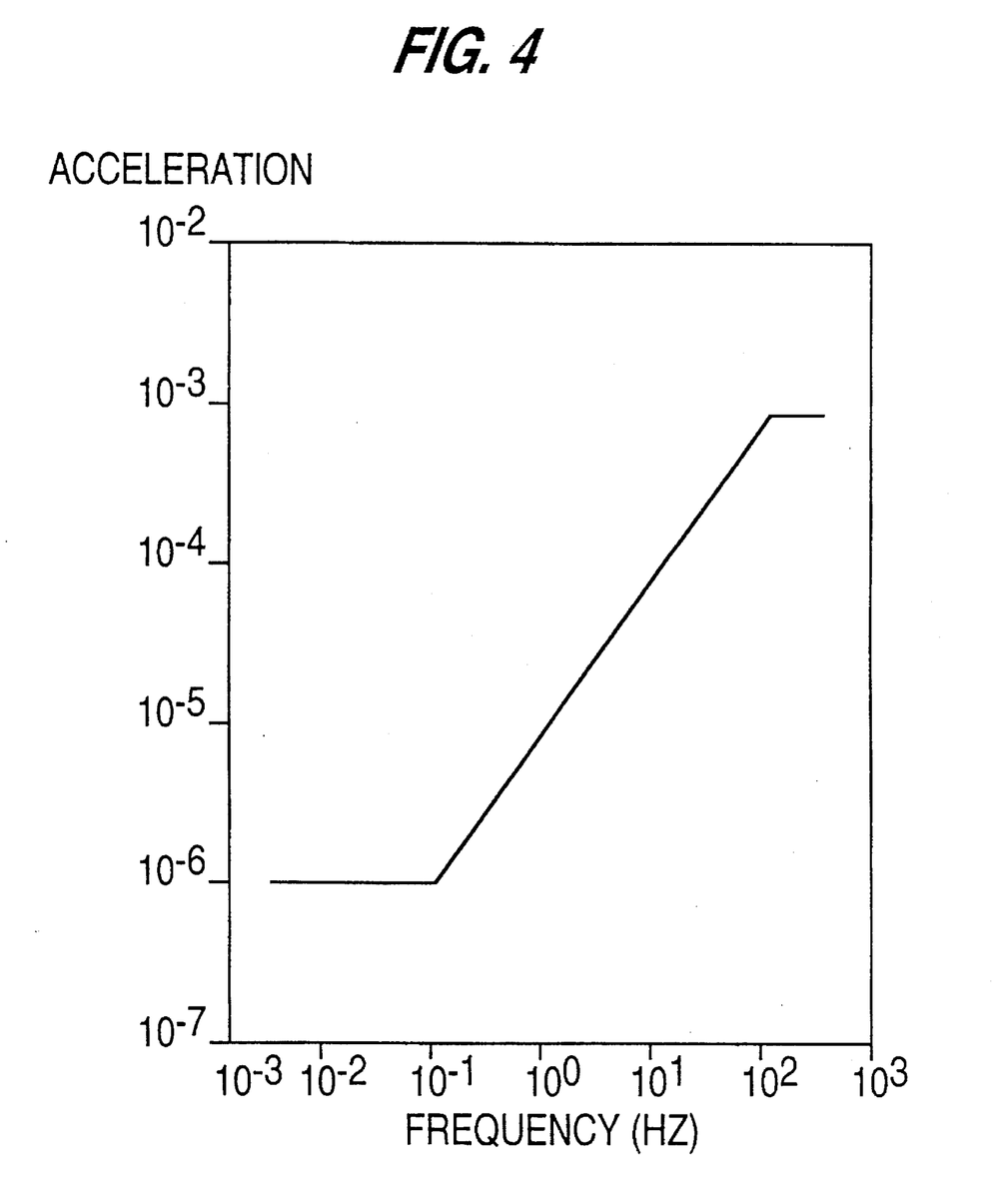
FIG. 4 is a diagram showing one example of initial threshold values.

FIG. 3 shows flows and constructions of a software for this system. In FIG. 3, a section-A shows a data input portion, in which detection of vibration data by the vibration sensors 2 are effected, and which inputs, checks and arranges data representing the status of the vibration source within the system such as a mission schedule (traveling programs and docking of a space shuttle), a motor or the like.

A section-B is a neural network routine, in which spectral analysis and vibration mode analysis are carried out, and classification of the factors as well as preparation of a threshold value curve are effected. In addition, the section-B investigates data fed back from a section-C as will be described later, prepares (calculates) a new threshold value curve and causes the data to be stored in a memory device.

A section-C is a fuzzy reasoning routine, in which a degree of working of an alarm or an actuator is judged on the basis of the factor analysis in the neural network portion of the section-B and the threshold value curve, and the data are reserved. Furthermore, in the section-C, operations of the source of the factors of vibrations are adjusted on the basis of the result of judgement (for example, a rotational speed of a motor or a pumping is lowered.), and/or a control amount of an actuator for use in active control is set, and further, an alarm is issued. In addition, in the section-C, the actuator 6 or the like is controlled so as to reduce vibrations expected to occur according to a programmed schedule by feed-forward control on the basis of the mission schedule data input in the section-A.

With the above-described construction, owing to the learning and predicting functions of the software forming the neural network section and the fuzzy section, even with respect to a space environment which cannot be verified at the time of development of this system on the ground, an accumulation of data after launching to the space can be applied to the system as empirical values, and so, a system performance is improved in the cosmic space. Also, even in a micro-gravity environment system installed on the ground or in a airplane or the like, it is possible to specifically determine and reduce causes of generation of harmful vibrations which destroy the micro-gravity environment.

Now, one example of a construction and an operation of a vibration sensor 2 used in the above-described embodiment will be described in detail.

Figure 5:
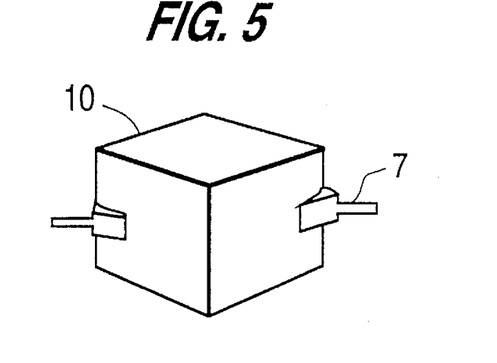
FIG. 5 is a perspective view showing a fixed state of a reflector mirror of a vibration sensor according to a first preferred embodiment of the present invention.
Figure 6:
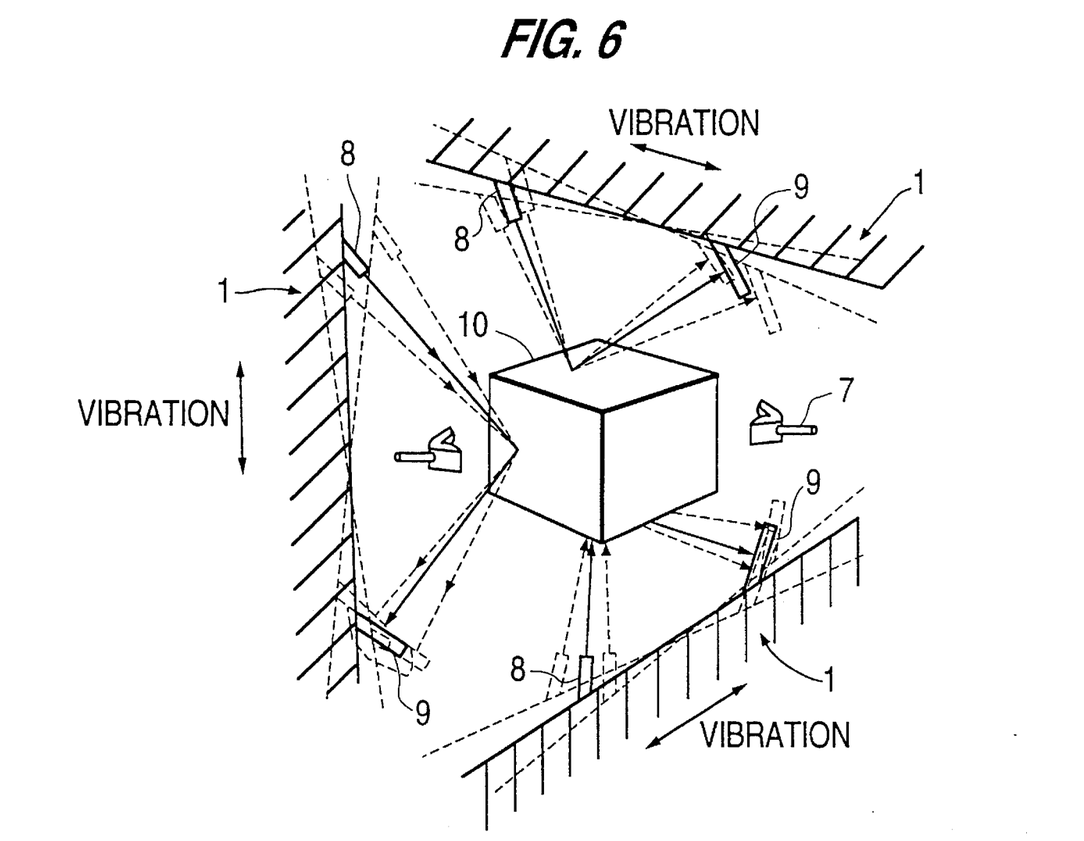
FIG. 6 is a perspective view showing a working state of a vibration sensor according to a first preferred embodiment of the present invention.

The vibration sensor according to the illustrated embodiment is composed of a reflection mirror (reflection plates) 10 consisting of a polyhedron having an arbitrary number of surfaces (one surface to ∞ surfaces (sphere)), a laser irradiator 8 for irradiating the reflection mirror 10 with light, a laser beam receiver 9 for receiving a laser beam reflected by the reflection mirror 10, and further a support mechanism 7 for supporting the reflection mirror 10. The laser irradiator 8, the laser beam receiver 9 and the support mechanism 7 are fixed to an airframe of the space station 1.

FIG. 5 shows the state where the reflection mirror 10 is fixed by means of the support mechanism 7.

It is to be noted that in the case of disposing a plurality of laser irradiators 48, it is made possible to dispose them so that the frequencies or wavelengths (colors) of the emitted laser beams may be different, and thereby erroneous reading by light receivers 49 are obviated.

FIG. 6 shows a working state of this vibration sensor 2 under a micro-gravity environment. A supporting mechanism 7 hold the reflection mirror 10 floating in a zero-gravity space. At this time, the surroundings of the reflector mirror 10 could be either vacuum or any arbitrary gas, and the reflector mirror 10 is held in a non-support/non-vibration state.

However, owing to enclosure of gas and active vibration-suppressing (loudspeaker, microphone, etc.) functions, it is possible to detect vibrations while carrying out three-dimensional position control of the reflector mirror 3 by moving the reflector mirror 10 within a predetermined range in the initial stage or in a continuous or intermittent manner and by applying deviation of detected waves caused by natural vibration within gas or rotation of the reflector mirror 10 simultaneously to a control filter.

It is to be noted that the gas and active vibration-suppression can be selectively made operable (in use) or inoperable.

The laser beam emitted by the laser irradiator 8 is reflected by the reflector mirror 10, and received by the laser beam receiver 9. It is possible to improve a detection capability for vibrations by inserting any arbitrary number of separate reflection mirrors in the optical path extending from the irradiator 8 via the reflection mirror 10 up to the laser beam receiver 9 and thereby elongating the optical path. The laser beam receiver 9 detects an amplitude, a frequency and the like of the vibration of the received laser beam. The laser beam receiver 9 detect the amplitude and the frequency of the vibration on the basis of movement of the received laser beam. The vibration data detected in the laser beam receiver 9 are transmitted to the computer 5, analyzed therein and used for control and the like of the above-mentioned actuators 6.

While a system in which a laser beam is emitted from a laser irradiator 8, then reflected by a reflection mirror 10 and received by a laser beam receiver 9 was described in the above-mentioned preferred embodiment, the present invention is not limited to such system, but any arbitrary energy such as light (visible light, invisible light) having various frequencies, electromagnetic waves, sound waves or the like could be employed.

A second preferred embodiment of a vibration sensor according to the present invention is shown in FIG. 7. The vibration sensors 22 according to this preferred embodiment shown in FIG. 7 are arrayed in multiple at a predetermined interval in a matrix-like array on a structure such as a space station 1 or the like as shown in FIG. 1, they are connected to a computer 5 via a DIU (Data Interface Unit) sampling unit 4 to measure vibrations of the structure, and the computer 5 controls the actuators 6 to suppress vibrations of the structure.

In the preferred embodiment shown in FIG. 7, a vibration sensor 22 comprises a laser irradiator 28, a laser beam receiver 29 disposed in opposition to the same irradiator 28, composed of charge-coupled devices (CCD) or the like and fixed to a structure, a lens 30 or a prism 33 consisting of a polyhedron having an arbitrary number of surfaces disposed between the same laser beam receiver 29 and the above-mentioned laser irradiator 28, made of predetermined material and having predetermined curvature or curved surface configurations, and a supporting device 27 provided so as to be detachable from and attachable to the same lens 30 or prism 33 and fixed to the structure.

Figure 7A:
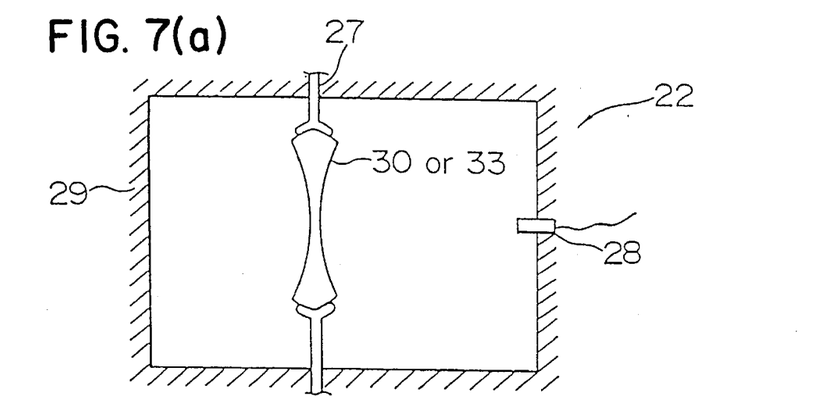
Figure 7B:
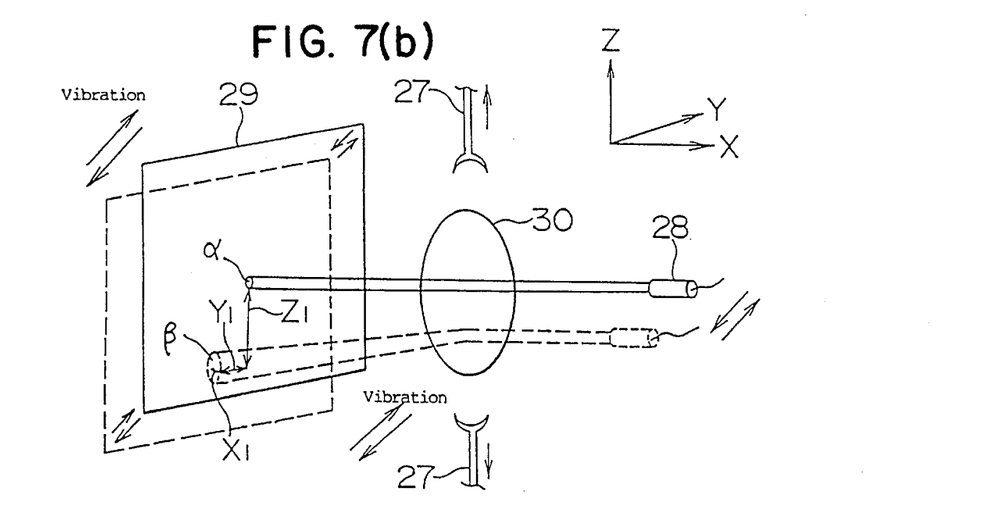

In the above-described vibration sensor, in the case of measuring vibrations of a structure under a micro-gravity environment, at first, starting from the state where the supporting device 27 supports a lens or a prism 33 as shown in FIG. 7(a), the support of the lens 30 or prism 33 by the supporting device 27 is released as shown in FIG. 7(b), and the lens 30 or prism 33 is held floating in a space. This is possible owing to the fact that the space is a micro-gravity space.

If a laser beam is emitted from the laser irradiator under the above-mentioned condition, then the laser beam makes incidence to the lens 30 or prism 33, in the lens 30 or prism 33 the laser beam is subjected to refraction and convergence corresponding to the characteristics determined by the curved surface configuration or the configuration of the polyhedron of the lens 30 or prism 33, and penetrates therethrough, and it is received by the laser beam receiver 29. The respective laser beam receivers 29 having received the laser beam output the laser beam reception data, the respective laser beam reception data are collected in a DIU sampling unit 4 via transmission paths 3 consisting of coaxial cables, twist cables, optical fibers, or the like as shown in FIG. 1, and they are transmitted to a computer 5 via this DIU sampling unit 4.

Figure 7C:
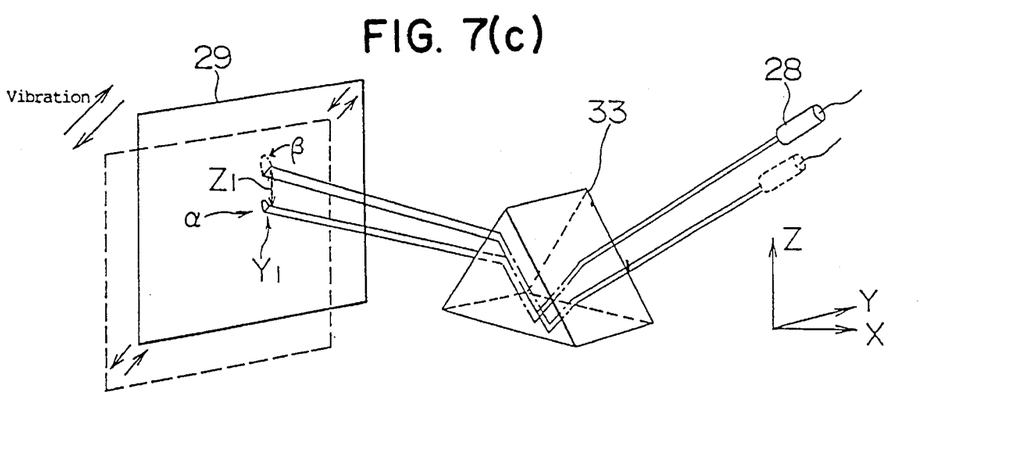

In the event that the above-described structure vibrate, while the laser irradiator 28 and the laser beam receiver 29 vibrate jointly with the structure, since the lens 30 or prism 33 is held floating in the space and is kept stationary, a receiving position of the laser beam emitted by the laser irradiator 28 on the beam receiving surface of the laser beam receiver 29 would vary in a mode corresponding to the characteristics determined by the vibration of the structure and the configuration of the lens 30 or prism 33.

With regard to the receiving position of a laser beam on the receiving surface of the laser beam receiver 29, as shown in detail in FIGS. 7(b) and 7(c), a displacement in the Y-axis direction is represented by a variable $Y_1$, a displacement in the Z-axis direction is represented by a variable $Z_1$, and a displacement in the X-axis direction is represented by a variable $X_1$ which is obtained by converting a variable of an image area $\beta$–$\alpha$ into a distance.

The above-described variables representing the displacements in the directions of X-, Y- and Z-axes, are input to the computer 5 via the DIU sampling unit 4, and since the characteristics of the lens 30 and prism 33 are known, the computer 5 calculates the acceleration, amplitude, frequency and the like of the vibration of the structure by making use of these known characteristics, displays them, and also performs control of the actuators 6 necessitated for suppression of vibrations.

Through the above-mentioned procedure, a vibration sensor capable of detecting a minute vibration of a structure under a micro-gravity environment, has been realized.

It is to be noted that while the above-described preferred embodiment concerns a vibration sensor making use of a laser beam, it can be modified to a vibration sensor making use of light, electromagnetic waves or sound waves having any arbitrary frequency by replacing an oscillator and an oscillation receiver which can emit and receive light, electromagnetic waves or sound waves having any arbitrary frequency, for the above-mentioned laser irradiator and laser beam receiver, and substituting members capable of refracting, converging and allowing to penetrate the respective waves for the lens or prism. In addition, in the case where a plurality of laser irradiator 8 are provided, it is preferable that the frequencies or wavelengths (colors) of the irradiating laser beams can be set differently so as to obviate erroneous reading by the laser beam receivers 9.

Also, the illustrated system can perform detection of vibrations while it is carrying out three-dimensional position control of the lens 30 and prism 33 by moving the lens 30 and prism 33 within a predetermined range in the initial stage or in a continuous or intermittent manner and applying deviations of the detected waves caused by natural vibration or rotation within gas of the lens 30 or prism 33 simultaneously to a control filter, owing to enclosure of gas and active vibration suppression (loudspeaker, microphone, etc.) functions.

Here, the enclosure of gas and active vibration suppression and the like could be such that selection of an operable (used) state and an inoperable (unused) state is possible.

Furthermore, it is possible to elongate or change an optical path and thereby improve a detection capability for vibrations by inserting any arbitrary number of reflection mirrors or separate lenses or prisms in the path extending from the irradiator 8 via the lens 30 or prism 33 up to the laser beam receiver 29.

Next description will be made on a third preferred embodiment of the vibration sensor according to the present invention with reference to FIGS. 8 to 10.

The vibration sensor according to this preferred embodiment is composed of a reflector 50 consisting of a polyhedron having any number of surfaces (1 to ∞ surfaces (sphere)), a laser irradiator 48 for irradiating the reflector 50 with laser beam, a planar laser beam receiver 49 constructed of CCD's so as to receive a laser beam reflected by the reflector 50, and further, a support mechanism 47 for holding the reflector 50. The laser irradiator 48, the laser beam receiver 49 and the supporting mechanism 47 are fixed to an airframe of a space station 1.

Figure 8:
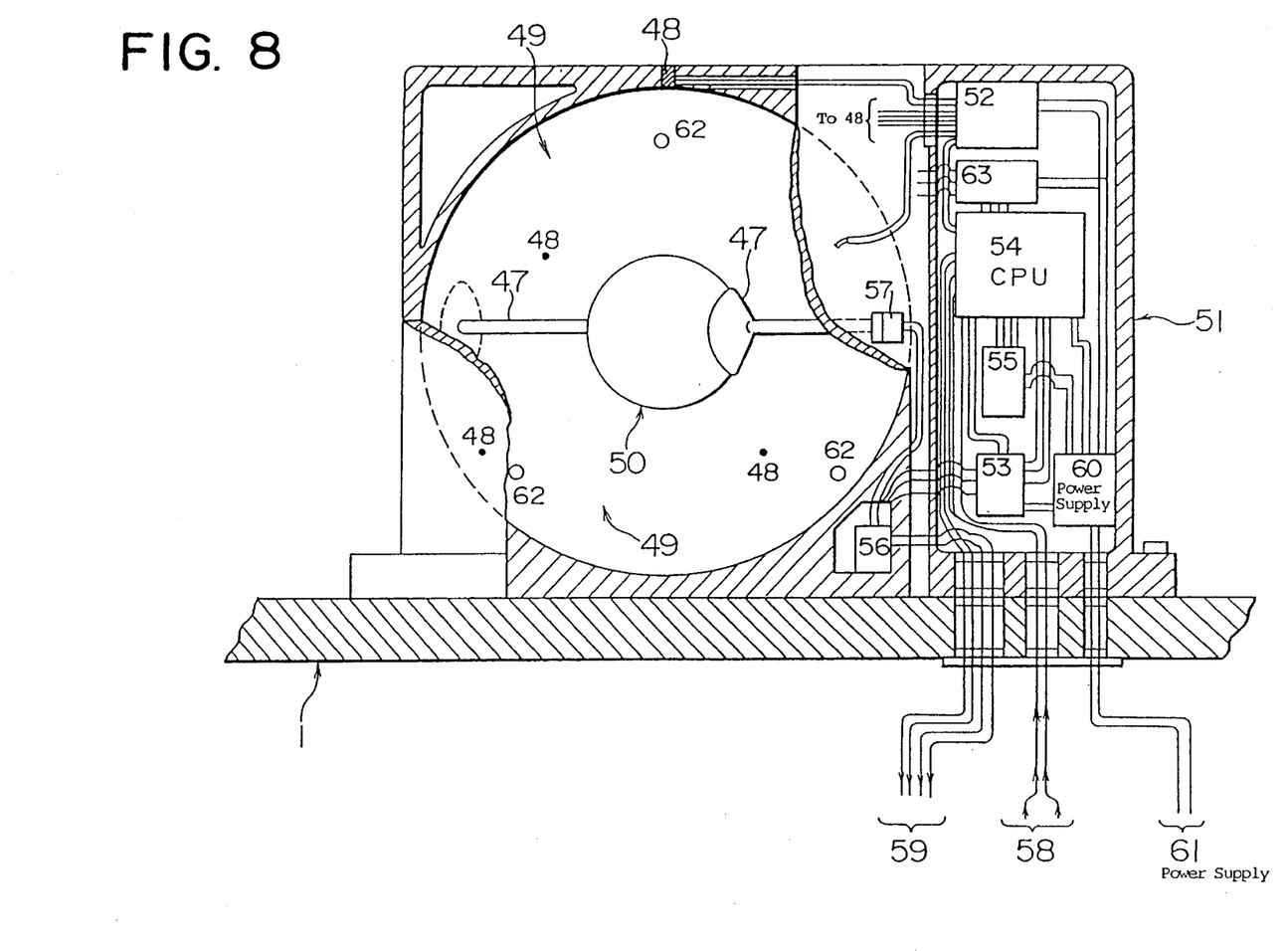
FIG. 8 is a cross-section view partly cut away and partly in block form of a vibration sensor according to a third preferred embodiment of the present invention, in which a reflector is kept fixed.

FIG. 8 shows the state where the reflector 50 is fixed by means of the supporting mechanism 47.

It is to be noted that in the case of providing a plurality of laser irradiators 48, it is made possible to differently set the frequencies, wavelengths or colors of the emitted laser beams so that erroneous reading by the laser beam receiver 49 may be obviated.

Figure 9:
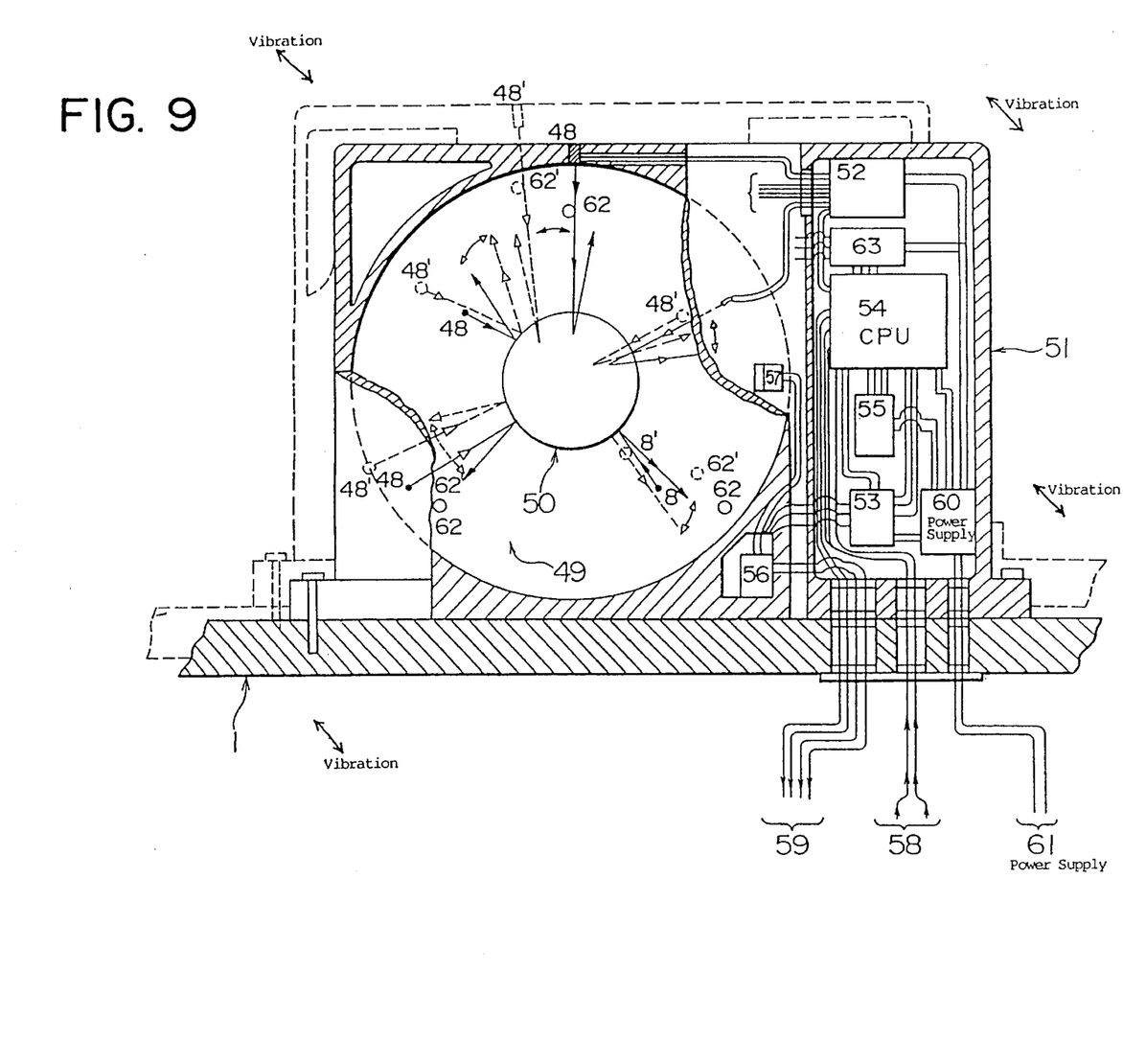
FIG. 9 is a cross-section view partly cut away and partly in block form of the vibration sensor according to the third preferred embodiment of the present invention, which shows a working state of the vibration sensor.

FIG. 9 shows a working state of this vibration sensor 2 under a micro-gravity environment. Although illustration is omitted, the supporting mechanism 47 is separated from the reflector 50 as gently attracted towards the inner surface of the laser beam receiver 49 by means of a support structure driver 57, and holds the reflector 50 in the condition of floating in a zero-gravity space. At this time, the surroundings of the reflector 50 could be either vacuum or any arbitrary gas, and the reflector 50 is held in a non-support/ non-vibration state.

However, in the case of carrying out the following treatment, the illustrated system is possible to detect vibrations while performing three-dimensional position control of the reflector 50 by moving the reflector 50 within a predetermined range in the initial stage or in a continuous or intermittent fashion with the aid of enclosure of gas and active vibration-suppressing (loudspeaker, microphone, etc.) functions and simultaneously applying a deviation of detected waves caused by natural vibration in gas or rotation of the reflector 50 to a control filter.

It is to be noted that with regard to gas, active vibration-suppressing and the like, it is possible to select either to operate (use) or not to operate.

Laser beams emitted from the laser irradiators 48 are reflected by the reflector 50, and received by the laser beam receivers 49. It is to be noted that it is possible to improve a vibration detecting capability by inserting any arbitrary number of separate reflector mirrors in the path extending from the irradiator 48 via the reflector 50 up to the laser beam receiver 49 and thereby elongating the optical path. The laser beam receiver 49 detects an amplitude, a frequency and the like of the vibration of the received laser beam. The laser beam receiver 49 detects an amplitude and a frequency of a vibration on the basis of movement of the received laser beam. The vibration data detected by the laser beam detector 49 are sent to a computer 5, then analyzed, and used for control or the like of the above-described actuators 6.

A sensor body frame 51 is fixed to a space station structure 1 and supports the laser irradiators 48 and the like.

A laser irradiator power supply controller 52 controls electric power fed to the respective laser irradiators 48, frequencies of the emitted laser beams and the like.

A laser beam reception data sampling unit 53 processes the data of vibration loci of laser beams emitted from the respective laser irradiators 48, then reflected by the reflector 50 and received on the laser beam receiving surface of the laser beam receiver 49, and transmits the processed data to the CPU 54.

Figure 10:
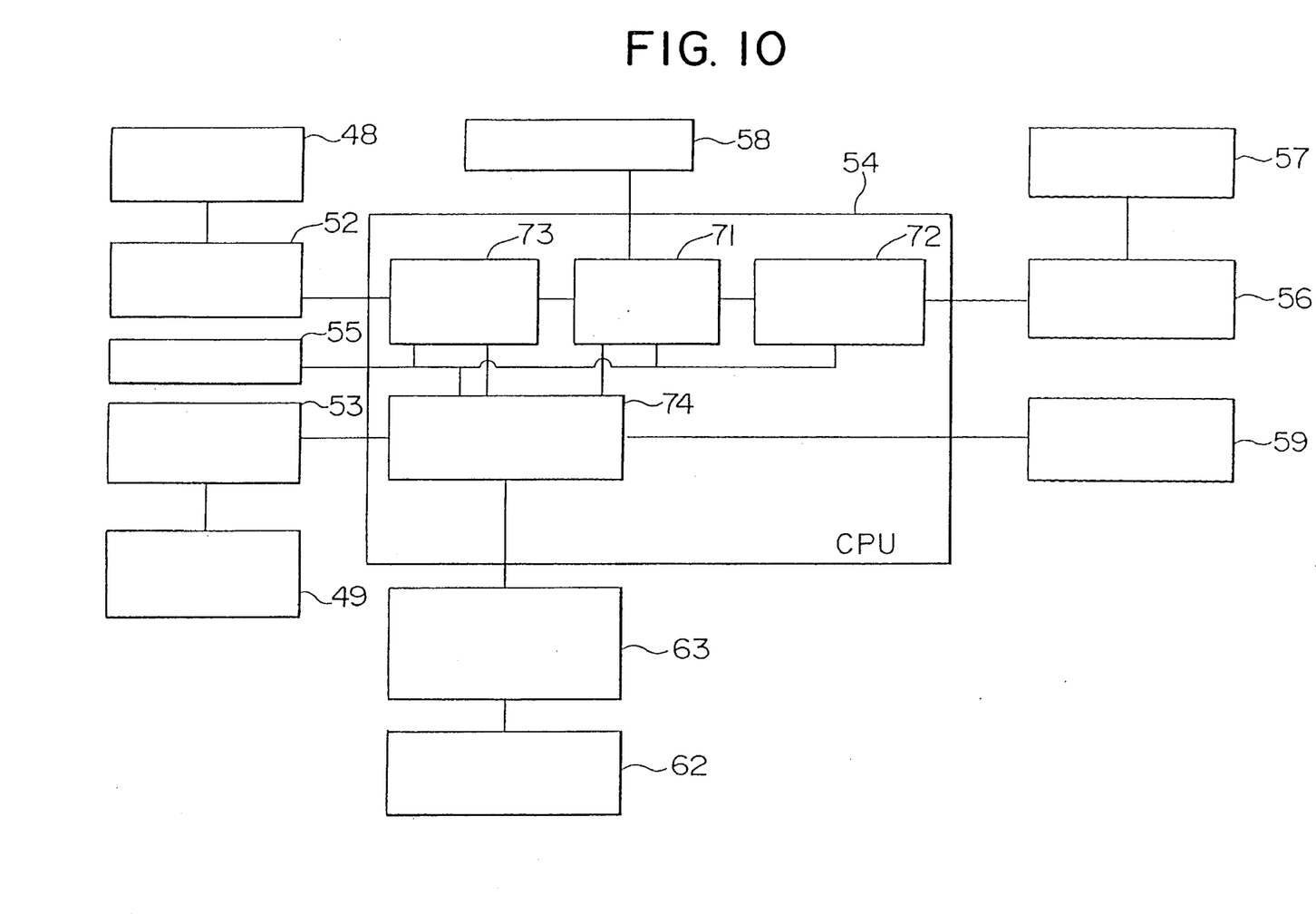
FIG. 10 is a flow chart showing an operation sequence of the vibration sensor according to the third preferred embodiment of the present invention.

The CPU 54 consists of function coupling means as shown in FIG. 10, and it performs the following operations.

At first, a detection start command is received from a command bus 58. The detection start command is transmitted to a support command generator 72 after it has been confirmed by scheduling means 71 that the command fulfils a necessary condition and a time condition, and then a support release command is issued to a support structure drive controller 56. In response to this command, the support structure drive controller 56 calculates a support release speed, a timing and the like and instructs these to a support structure driving device 57, hence support of the reflector 50 by the support mechanism 47 is released, and the reflector 50 is caused to float in a zero-gravity space.

Next, under the floating condition of the reflector 50, laser beam irradiation for the purpose of calibration is instructed from the scheduling means 71 to a laser beam emission controller 73. In response to this instruction, after a detailed process such as selection of the laser irradiators 48 has been clarified, the laser beam emission controller 73 instructs to a laser irradiator power supply controller 52, and the same laser irradiator power supply controller 52 allots laser wavelengths, electric power supplies and the like to the respective laser irradiators 48 as described previously.

At the time of calibration, laser beams are emitted from all the laser irradiators 48 towards the reflector 50. Laser beams reflected by the reflectors 50 are received by the laser beam receivers 49, and the reception signals are transferred as data to the laser beam reception data sampling unit 53. Here, the laser beam reception data sampling unit 53 performs simple calculations by means of a large amount of data to seek for vibrating direction characteristics and coordinate transformations for the respective wavelengths, that is, for the respective colors, and outputs them to a reflector motion calculator 74 of the CPU 53.

In the reflector motion calculator 74, the position and motion such as speed, acceleration, amplitude, period and the like of the reflector 50 are calculated by making use of these data. Then it outputs the calculated reflector motion to a controller 63 for active vibration suppression of the reflector to cause a wave projector 62 to be controlled by the reflector active vibration-suppressing controller 63 so that a wave opposite to the reflector motion may be formed in a thin gas so as to hold the reflector 50 within a predetermined space. It is to be noted that while a low-frequency loudspeaker is most commonly used as the wave projector 62, besides other means for applying a wave to gas such as a high-frequency sound wave generator can be employed.

Under the condition that the reflector 50 could be stopped in motion or could be suppressed to a vibrating state in a predetermined range, the motion of the reflector under this stationary state is input to a memory 55, and it is later used as a filter.

The above-described is a procedure of calibration, and now description will be made on the operation of the CPU 54 in the case of measuring vibrations as a vibration sensor.

In the case of vibration measurement also, the laser irradiator 48 is held in an ON state continuously from the time of calibration, hence while the laser beam reflected from the reflector 50 is being received by the laser beam receiver 49, the data passed through the laser beam reception data sampling unit 53 are processed in the reflector motion calculator 74 to seek for motion of the reflector 50, furthermore as described previously, the motion under the stationary state read out of the memory 55 is input to the reflector motion calculator 74, and by subtracting the motion from the motion at the present, vibration of the vibration sensor is calculated. The calculated vibration is sent to a data transmission bus 59.

While a system wherein a laser beam is emitted from the laser irradiator 48 then reflected by the reflector 50 and received by the laser beam receiver 49 has been explained in the above-described third preferred embodiment, the present invention is not limited to such system, but any arbitrary energy such as light (visible light and invisible light), electromagnetic waves, sound waves or the like having various frequencies could be employed.

In addition, while a system making use of a reflector 50 has been disclosed in the above-described third preferred embodiment, even if the system employs a transparent refractor as is the case with the second preferred embodiment, similar effects and advantages can be obtained.

As described in detail above, according to the present invention, maintenance of a micro-gravity environment, which is one of the most important problems in a pace system, a space shuttle, an artificial satelite and in microgravity environmental system on an aircraft and on the ground, becomes possible.

Also, owing to learning and predicting functions by a software of the system, even with respect to a space environment which cannot be verified at the time of development of this system on the ground, accumulation of data after launching to the space can be utilized for the system as empirical values. Accordingly, a performance of a system is in itself improved in the cosmic space.

In addition, with the vibration sensor according to the present invention, vibrations can be measured accurately under a micro-gravity environment. Moreover, since the reflector mirror has no support, a measurable range of the nature (acceleration, amplitude, frequency, etc.) of the vibrations to be detected is not subjected to any limitation.

While a principle of the present invention has been described above in connection to preferred embodiments of the invention, it is intended that all matter contained in the above specification and illustrated in the accompanying drawings shall be interpreted to be illustrative and not in a limiting sense.

What is claimed is:

1. A vibration factor analyzing system for use in a micro-gravity environment, comprising:

a plurality of vibration sensors disposed on a vibration body held under a micro-gravity environment;

data storage means for storing vibration data of said sensors and a threshold vibration spectra;

analyzing means for analyzing vibration data detected by said vibration sensors to obtain vibration spectra;

a factor extracting section for specifying a vibration source on the basis of a comparison between said vibration spectra obtained by said analyzing means and said threshold vibration spectra stored in said data storage means;

actuators disposed on said vibration body;

an actuator control section responsive to vibration energy detected by said vibration sensor and a vibration source specified by said factor extracting section for controllably driving said actuators so as to reduce harmful vibrations and eliminating the factors of vibrations and for sending data to said data storage means; and prediction means for predicting a next occurrence of vibrations based on said data and for improving said threshold vibration spectra and sending said prediction and said improved threshold vibration spectra to said data storage means.

2. A vibration sensor for measuring vibrations under a micro-gravity environment, comprising:

a reflector disposed as floating in a micro-gravity space and consisting of a polyhedron having an arbitrary number of surfaces reflecting predetermined energy having various frequencies according to known characteristics;

output means fixed to a vibration body for irradiating said reflector with said predetermined energy; and receiving means fixed to said vibration body for receiving reflection energy reflected from said reflector and measuring the natures of vibrations of said vibrating body on the basis of variations of said reflection energy wherein there is provided active vibration suppressing means for holding said reflector and refractor stationary in a micro-gravity space.

3. A vibration sensor for detecting vibrations under a micro-gravity environment, comprising:

a transparent refractor disposed as floating in a micro-gravity space and having know characteristics;

an irradiator disposed on one side of said transparent refractor and fixed to a structure whose vibrations are to e detected for irradiating with light rays; and a light receiver disposed on the other side of said transparent refractor as opposed to said irradiator and fixed to said structure for receiving the light rays radiated by the irradiator via the transparent refractor wherein there is provided active vibration suppressing means for holding said reflector and refractor stationary in a micro-gravity space.

4. A vibration sensor as recited in claim 2, wherein said predetermined energy is at least one of laser beams, light, electromagnetic waves and sound waves.

5. A vibration factor analyzing system for use in a micro-gravity environment, comprising:

a plurality of vibration sensors disposed on a vibrating body held under a micro-gravity environment;

analyzing means for collecting vibration data and vibration spectra;

a neural network extracting section for specifying a vibration source on the basis of the vibration spectra analyzed by said analyzing means;

actuators disposed on said vibration body; and a fuzzy control section responsive to vibration energy detected by said vibration sensor and said vibration source specified by said neural network section for controllably driving some of said actuators so as to reduce harmful vibrations and/or eliminating the factors of vibrations; and wherein vibration sensor comprises:

a reflector disposed as floating in a micro-gravity space and consisting of a polyhedron having an arbitrary number of surfaces reflecting predetermined energy such as laser beams, light electromagnetic waves, sound waves and the like having various frequencies according to known characteristics;

output means fixed to a vibration body for irradiating said reflector with said predetermined energy; and receiving means fixed to said vibration body for receiving reflection energy reflected from said reflector and measuring the natures of vibrations of said vibrating body on the basis of variations of said reflection energy.

6. A vibration sensor as recited in claim 5, wherein said predetermined energy is at least one of laser beams, light, electromagnetic waves and sound waves.

7. A vibration factor analyzing system for use in a micro-gravity environment, comprising:

a plurality of vibration sensors disposed on a vibrating body held under a micro-gravity environment;

analyzing means for collecting vibration data and vibration spectra;

a neural network extracting section for specifying a vibration source on the basis of the vibration spectra analyzed by said analyzing means;

actuators disposed on said vibration body; and a fuzzy control section responsive to vibration energy detected by said vibration sensor and said vibration source specified by said neural network section for controllably driving some of said actuators so as to reduce harmful vibrations and/or eliminating the factors of vibrations; and wherein vibration sensor comprises:

a transparent refractor disposed as floating in a micro-gravity space and having know characteristics;

an irradiator disposed on one side of said transparent refractor and fixed to a structure whose vibrations are to e detected for irradiating with light rays; and a light receiver disposed on the other side of said transparent refractor as opposed to said irradiator and fixed to said structure for receiving the light rays radiated by the irradiator via the transparent refractor.

8. A vibration sensor as recited in claim 7, wherein said predetermined energy is at least one of laser beams, light, electromagnetic waves and sound waves.

* * * * *